Patented July 24, 1934

1,967,564

UNITED STATES PATENT OFFICE 1,967,564

PREPARATION OF ERGOT AND PROCESS OF MAKING SAME

Marvin R. Thompson, Baltimore, Md., assignor to Abbott Laboratories, North Chicago, Ill.

No Drawing. Continuation of application Serial No. 407,282, November 14, 1929. This application March 23, 1933, Serial No. 662,385

8 Claims. (Cl. 167—67)

This invention is directed to a process for the treatment of and improving the quality of ergot, and also directed to the ergot product resulting from such process.

Ergot is a widely known and used medicine and contains a number of physiologically active alkaloids and other active principles. Freshly collected ergot, it is believed contains essentially no highly active injurious substances, but it has been clearly demonstrated that when ergot has been gathered for six to eight months or longer, it will be found to contain certain very toxic and highly undesirable impurities, probably produced by the decomposition in the original material. Among such known toxic substances may be listed histamine (ergamine), tyramine, acetyl and other cholines, agmatine, guanido-butyl amine, isoamyl amine, and others, each and all of which are toxic and generally soluble in the solvents ordinarily used to extract the alkaloids and other active desirable principles of ergot.

As all or practically all ergot appearing on the American market has been gathered for at least six months, and some of it for several years, it is to be expected that these toxic substances may sometimes occur in harmful, if no dangerous quantities in the ergot intended for and used as a medicinal agent. As a matter of fact extensive research has clearly demonstrated the presence of these toxic and injurious substances in ergot on the market, and has also demonstrated the further fact that such injurious substances noticeably increase during prolonged storage of ergot. It is also known that the customary extraction with benzine, gasoline, petroleum ether, preliminarily employed for the removal of the oily or fatty constituents of ergot, does not remove these toxic substances, and that such substances, notwithstanding known treatments appear in available preparations in varying proportions.

The method as carried out for the treatment of ergot or ergot preparations may be generally defined in the following examples, such being given, however, as specific instances for the purposes of a clear understanding of the invention and not for the purposes of correspondingly limiting the scope of the claims defining the invention.

Example 1.—The ground up ergot may be first subjected to the customary washing or percolation with a sufficient amount of gasoline, benzine, or petroleum ether for removing the fatty or oily bodies, and to condition the ergot for treatment by the subsequent aqueous liquid. This defatting treatment is not, however, absolutely necessary for the purposes of the present method. The drug is then dried of the fat solvent, if used, by exposure to a current of warm air or other conventional means. The drug is then subjected to the solvent action of water containing carbonates, bi-carbonates or hydroxides of non-toxic metals, as soduim, potassium, calcium, or the corresponding ammonium compounds. This operation may be effected by maceration, percolation, or washing. This method step serves to remove the undesirable toxic substances, but this step, it is to be emphasized, does not remove the alkaloids or any substantial amounts of any of the useful active constituents of the ergot. Water alone can be used for this step, but such causes a slight loss of the alkaloids present in the ergot, owing to the natural slightly acid condition of the ergot.

The treatment with water or aqueous carbonate, bicarbonate or hydroxide solution is carried out at a relatively low temperature, for example, below 10° C., with a view to prevent any fermentation or putrefaction of the drugs; or, if desired, very small amounts of preservative substances, as chloroform, carbon-tetrachloride, volatile oils, chlor-butanol, or the like, may be added to the aqueous menstruum. When using the soluble alkali metal carbonates or bi-carbonates, solutions of 1.2% strength up to 10% strength may be safely employed. When using the soluble hydroxides, however, such as caustic soda, the concentration should not be over 5% in any event, and preferably solutions of about 0.25% to 1.5% are employed. The carbonates and bi-carbonates are preferred to the hydroxides, for the reason that the latter strong alkalies cause decomposition of the active agents.

It may be stated that the aqueous liquid used in this step not only removes the nonspecific toxic bodies, but also neutralizes the natural acidity of the drug, and thereby prevents loss of the desirable active constituents during the carrying out of this step. The excess reagent is then removed from the drug by washing with water. The residue of the extraction is preferably pressed to drive out as much of the aqueous liquid as possible, and may then be dried at a low temperature and stored for a long period under proper condtions (such as absence of moisture and high temperatures) without the likelihood of toxic substances being again formed therein.

The aqueous solution will of course remove certain other undesirable substances from the ergot, such as proteins, coloring matter, etc., and thereby materially improve the quality of the material if it is to be used for hypodermic or other injections, in which uses the presence of proteins or substances other than the desirable active agents are likely to cause disturbances in the patient. The drying operation of this step is not absolutely necessary and may be omitted if the drug is to be immediately used for the preparation of extracts or with other remedies.

Following the preceding step, with or without subsequent drying, the drug can be treated with solvents for the contained active principles. Among such serviceable solvents may be mentioned alcohol, ether, acidified alcohol, acidified water and alcohol, with or without glycerine or other organic solvent.

In connection with the preceding step it is to be noted that sodium or potassium bi-carbonates can be used very effectively and safely in removing the toxic and inert impurities, but that the alkaline hydroxides can be used only with great danger of decomposing valuable alkaloids, thereby causing a destruction of the desirable physiological activity and the natural ratio of the alkaloids, one to the other, in the resultant product. The same danger accompanies the use of any and all of the usual high ionized alkalies. Only chemicals which are of themselves practically neutral, but which possess a latent alkalinity only in the presence of an acid can advantageously be used. Sodium and potassium bi-carbonates and to a great extent the corresponding carbonates are such substances, and their use is attended by practically no decomposition of the valuable active principles and no loss in activity during this leaching step in Example 1, or in the precipitating step in Example 2, to be later described.

In connection with Example 1, other solvents, such as ethylene glycol, ketones such as acetone, esters such as ethyl acetate, higher alcohols such as butyl or amyl alcohol, or ethers, can also be used as extractive solvents. The solvents may be acidified with a mineral or organic acid, for example, 0.5% of hydrochloric or other mineral acid, or up to 4% or 5% of tartaric acid or other organic acids. These solvents should subsequently be removed with water or alcohol substituted. The extract can then be diluted to the extent desired, and is suitable for either oral or hypodermic administration. If it is to be used for hypodermic injection the alcohol content and hydrogen ion (pH) concentration should be suitably adjusted. Alcohol can be distilled off, preferably under reduced atmospheric pressure and the hydrogen ion concentration can be reduced by careful addition of nontoxic alkalies. Suitable preservatives, such as chlor-butanol, may also be added to prevent deterioration of the active principles. Any of the ergot preparations developed by this method may be further purified if desired, as in Example 2.

*Example 2.*—Ergot preparations occurring on the market and usually containing solutions of the active agents of ergot in alcohol and water or alcohol, acid and water, usually contain more or less of the objectionable toxic and inert substances above referred to. These can be purified by the following treatment.

The alcohol present is preferably distilled off under reduced pressure, or, the alcohol concentration may be reduced by simple dilution to several times its original volume with water. The acidity is then neutralized by the use of carbonates, bi-carbonates, or hydroxides of non-toxic metals, as above indicated. The alkaloids and other desirable active principles are thereby rendered insoluble and precipitated. Bi-carbonate of soda is distinctly preferably in this acid neutralization as the alkalies cause appreciable decomposition of the active principles.

The precipitated active principles, separated from the liquid by filtration, decantation, shaking out by using an immiscible solvent (ether, etc.) and subsequently recovering the active principles by evaporation of the ether or the like, are redissolved in a suitable quantity of acidified water, alcohol, acidified alcohol and water, or other suitable solvents, and a small quantity of a preservative, such as chlor-butanol added, if desired, to prevent deterioration of the solution.

The resulting purified preparation, or the preparations made from the purified drug retain the greater part of their physiological activity, as shown by the tests commonly employed, as the Cock's comb test and the Broom-Clark isolated rabbit uterus test, etc.

More briefly stated, the process forming the subject matter of the present invention involves first, starting with powdered ergot the substantially complete removal of all the extractive material of ergot, except the specific alkaloids, by percolation with water treated, preferably, with sodium bi-carbonate. The specific alkaloids of ergot are insoluble in water or sodium bi-carbonate solution, while the objectionable principles are completely soluble in such a solution. After complete removal of these objectionable constituents in this manner, the drug is subjected to the solvent action of liquids in which the specific alkaloids of ergot are completely soluble. This last percolate constitutes the improved preparation, and contains only the specific alkaloids of ergot in their natural ratio, in solution, second, starting with conventional crude extracts of ergot, the subject matter of the present invention involves reducing the alcohol concentration of the extract by distillation under reduced pressure or by suitable dilution with water, neutralizing the acidity with sodium bicarbonate or other suitable weakly alkaline reagent, thus causing precipitation of the total alkaloids. The precipitated total alkaloids are collected by filtration, or by shaking out with an immiscible solvent. In the latter case the total alkaloids are obtained by evaporation of the volatile immiscible solvent, ether, benzol, etc.

The preparation, produced as a result of the method defined, presents a new product. There is produced under the purifying process a solid product wherein essentially all of the undesirable toxic and inert extractives have been removed, with the only remaining extractives those of the therapeutically desirable active alkaloids existing in their natural ratio, unimpaired by drastic chemical agents. Furthermore, the enzymes responsible for the deterioration of the active principles of the drug have been removed. The further step of the process results in a product appearing as a crystal-clear solution of the total active principles of ergot in their natural ratio, substantially free from objectionable non-specific amines, enzymes, and inert extractives. All other liquid products of ergot, so far as known, which contain the total alkaloids in their natural ratio, also contain the non-specific amines, enzymes, and inert extractives, and are necessarily unstable, their therapeutic action is slow and not dependable, and undesirable side actions result from the toxic impurities. All other solid products of ergot, so far as known, consist of either (1) of the total active principles contaminated with the objectionable impurities; or (2) of one or another of the single individual isolated alkaloids, but not in admixture in their natural ratio.

This application is filed as a continuation of my application filed November 14, 1929, Serial Number 407,282.

What is claimed as new, is:—

1. A process for the removal of toxic impurities from ergot, consisting in treating the ergot with water containing a material selected from a group including carbonates, bicarbonates, or hydroxides of ammonium, sodium, potassium, or calcium, to thereby bring the pH to a value of not less than 7.0 and not more than 9.0, and separating the aqueous solution containing the toxic and inert impurities from the residual material containing the active components of the ergot.

2. A process which comprises crushing raw ergot and leaching the same with an alkaline aqueous liquid which is non-injurious to the active principles of ergot and in which said active principles are insoluble, to thereby remove the objectionable toxic and inert substances, and thereafter treating the solid residue of such step with organic solvents of the active principles of the ergot.

3. A process which comprises crushing raw ergot leaching the same with an aqueous solution containing a material of a group including carbonates, bicarbonates, or hydroxides of ammonium, sodium, potassium, or calcium in such proportions as to impart a pH value of 7.0 to 9.0 to avoid injury to the active principles of the ergot, separating the solution carrying the toxic and inert impurities from the residue material, and treating such residue material with solvents for dissolving the active principles of the ergot.

4. A process for removing toxic and inert impurities from an ordinary commercial extracts of ergot, consisting in diluting the extract with water to reduce the alcohol concentration, precipitating the desirable active principles contained in the extract with a material of a group including carbonates, bicarbonates, or hydroxides of ammonium, sodium, potassium, or calcium, to thereby bring the pH of the diluted extract to a value of not less than 7.0 and not more than 9.0, recovering the precipitated desirable active principles and drying the recovered material at a low temperature.

5. A process for removing toxic and inert impurities from ordinary commercial extract of ergot, consisting in diluting the extract with water to reduce the alcohol concentration, precipitating the desired active principles contained in the extracts with a material of a group including carbonates, bicarbonates, or hydroxides of ammonium, sodium, potassium, or calcium, to bring the pH of the diluted extract to a value of not less than 7.0 and not more than 9.0, recovering the precipitated active principles of the material, and immediately re-dissolving said active principles in a suitable solvent, as one of a group including acidified water, alcohol, or conventional organic solvents.

6. An ergot product having all undesirable amines, enzymes and inert extractives eliminated said product being formed by precipitating the desired principles with a material of a group including carbonates, bicarbonates, or hydroxides of ammonium, sodium, potassium, calcium, lithium, magnesium, or strontium, said precipitated active principles being redissolved in a solvent to present a crystal-clear solution of the total active principles of the ergot.

7. An ergot product having all undesirable amines, enzymes and inert extractives eliminated, said product being formed by precipitating the desired principles with a material of a group including carbonates, bicarbonates or hydroxides of ammonium, sodium, potassium, calcium, lithium magnesium, or strontium.

8. A solid ergot product having all undesirable amines, enzymes, and inert extractives eliminated, said product being formed by the precipitate resulting from treatment of conventional de-alcoholized extracts of ergot with a material of a group including carbonates, bicarbonates, or hydroxides of ammonium, sodium, potassium, calcium, lithium, magnesium, or strontium.

MARVIN R. THOMPSON.